(12) United States Patent
Winsor

(10) Patent No.: US 8,554,876 B2
(45) Date of Patent: Oct. 8, 2013

(54) USER PROFILE SERVICE

(75) Inventor: Gerald W. Winsor, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3121 days.

(21) Appl. No.: 10/763,506

(22) Filed: Jan. 23, 2004

(65) Prior Publication Data

US 2005/0164704 A1 Jul. 28, 2005

(51) Int. Cl.
*G06F 15/16* (2006.01)
*G06F 15/173* (2006.01)
*H04L 5/12* (2006.01)

(52) U.S. Cl.
USPC .......................... 709/219; 709/223; 370/229

(58) Field of Classification Search
USPC ....................................... 709/219; 455/432.3
See application file for complete search history.

(56) References Cited

U.S. PATENT DOCUMENTS

| | | | |
|---|---|---|---|
| 5,671,436 A | 9/1997 | Morris et al. | |
| 6,199,067 B1 | 3/2001 | Geller | |
| 6,199,099 B1 | 3/2001 | Gershman et al. | |
| 6,401,085 B1 * | 6/2002 | Gershman et al. | 1/1 |
| 6,453,345 B2 * | 9/2002 | Trcka et al. | 709/224 |
| 6,640,097 B2 * | 10/2003 | Corrigan et al. | 455/414.1 |
| 7,054,648 B2 * | 5/2006 | Abtin et al. | 455/456.2 |
| 7,089,594 B2 * | 8/2006 | Lal et al. | 726/31 |
| 7,310,307 B1 * | 12/2007 | Das et al. | 370/229 |
| 2002/0024536 A1 * | 2/2002 | Kahan et al. | 345/745 |
| 2002/0187775 A1 * | 12/2002 | Corrigan et al. | 455/414 |
| 2003/0008661 A1 * | 1/2003 | Joyce et al. | 455/456 |
| 2003/0009561 A1 * | 1/2003 | Sollee | 709/227 |
| 2003/0026404 A1 * | 2/2003 | Joyce et al. | 379/144.01 |
| 2003/0078053 A1 * | 4/2003 | Abtin et al. | 455/456 |
| 2003/0120593 A1 * | 6/2003 | Bansal et al. | 705/39 |
| 2003/0188155 A1 * | 10/2003 | Petit | 713/155 |
| 2004/0135805 A1 * | 7/2004 | Gottsacker et al. | 345/751 |
| 2004/0259534 A1 * | 12/2004 | Chaudhari et al. | 455/414.1 |
| 2005/0044197 A1 * | 2/2005 | Lai | 709/223 |

FOREIGN PATENT DOCUMENTS

| | | |
|---|---|---|
| EP | 1 199 860 A1 | 10/2000 |
| EP | 1 182 587 A2 | 2/2002 |
| WO | WO 0069180 | 11/2000 |

* cited by examiner

*Primary Examiner* — Scott Christensen
*Assistant Examiner* — Joiya M Cloud

(57) ABSTRACT

Systems, methods, and device are provided for a user profile service. One embodiment includes a method for user profile service. The method includes collecting user profile data from different network sources in a localized database. Business rules are provided to an application server to manage access to the collected user profile data in the database. The method further includes allowing different network service applications to access the collected user profile data as determined by the business rules.

29 Claims, 7 Drawing Sheets

USER PROFILE SERVICE

Mobile handheld multifunction devices capable of both voice and data functions have proliferated in recent years. Certain mobile devices are capable of different network type connections. Examples of these different network types include the public switched telephony network (PSTN), mobile or wireless voice networks, e.g., public local mobile networks (PLMNs), IP networks, and public wireless local area networks (PwLANs), etc. The PSTN refers to the public phone networks as known by those of ordinary skill in the art. The PSTN is composed of switches and T1/E1 trunks, central office, etc. The PSTN uses circuit-switched technology, in which necessary resources are allocated (dedicated) for the duration of a phone call.

An IP network (e.g., the Internet), in contrast, is composed of nodes of computers, servers, routers, and communications links, etc. The IP network employs packet-switching technology that decomposes data (e.g., voice, web pages, e-mail messages, etc.) into IP packets. Each packet is then transmitted over an IP network to a destination identified by an IP address and reassembled at the destination. An IP transmission is completed without pre-allocating resources from point to point. PLMNs are moving away from circuit-switched networks toward more and more use of packet-switched networks, including the use of wideband-code division multiple access (W-CDMA) and CDMA2000 technology, all of which increase data rates for third generation (3G) wireless communications.

FIG. 1 illustrates a mobile network, or wireless telecommunications network 100, which can be operated by an industry wireless provider or operator, e.g., AT&T wireless, Vodafone, Verizon, Nextel, Sprint, and T-Mobile are present wireless providers. Mobile networks may include ANSI/IS-41 and GSM MAP types of networks. American national standards institute (ANSI) networks using code division multiple access (CDMA), time division multiple access (TDMA) or technologies of the like, as well as global systems for mobile (GSM) type networks, are well known to those skilled in the art. Such a wireless networks can provide cellular/PCS (personal communication service) services like call origination and call delivery, streaming data, text messaging, etc., for an appropriately enabled roaming mobile device or handset 102. These wireless networks 100 include one or more mobile switching centers (MSCs) 104 and 124 which are connected to a plurality of base stations (BS) 106 and 126 that are dispersed throughout the geographic area serviced by the system. The geographic area serviced by a wireless telecommunications system is partitioned into a number of spatially distinct areas called "cells." Each MSC 104 and 124 is responsible for, among other things, establishing and maintaining calls between mobile devices and/or between a mobile device and a wireline terminal which is connected to the wireless network from a local and/or long-distance networks, e.g., the regional Bells, Sprint, MCI, etc, in the PSTN 120.

An MSC 104/124 is a telephone switch specialized for wireless and mobility support. As mentioned above an MSC 104/124 performs various functions, including mobility management, call handoffs, call admission, call control, resource allocation, and so forth. A call and/or other data can be relayed from the MSC to base stations and via a wireless communication interface to the mobile device.

Whenever a mobile device 102 activates or roams into a new MSC coverage area, i.e., the "cell" for which a given MSC is responsible, the new MSC becomes the serving MSC. A mobile device can transmit its stored identity, e.g., its international mobile subscriber identity (IMSI), mobile subscriber integrated services digital network (MsISDN) number or the like, to the new serving MSC via a base station. Subscriber identity information is transmitted over a radio channel 108 in a format compliant with an air interface standard 105, e.g. ANSI/IS-41, GSM, etc., and detected by an antenna 110 of the base station 106.

A base station, in turn, transmits the subscriber identity information to the serving MSC, such as for example via communication line 112, where it can be stored in a database associated with the MSC. In order to provide mobile service to the newly registered mobile device 102, the serving MSC 104 transmits a Mobile Application Part (MAP) based signal, such as a registration notification signal (IS-41 message) or location update signal (GSM message), to a home location register (HLR) 116 via a signaling link such as a signal transfer point (STP) 114. An STP is a node in the signaling system 7 (SS7) telephone network that routes messages between exchanges and between exchanges and databases that hold subscriber and routing information. In the embodiment of FIG. 1, the STP 114 routes the MAP based signal to a gateway MSC 118. As shown in FIG. 1, the gateway MSC 118 can serve as a network switch for connecting to the public switched telephone network (PSTN) 120. In voice networks, voice switches known as service switching points (SSPs) query service control point (SCP) databases using packet switches known as signal transfer points (STPs). As shown in FIG. 1, the PSTN 120 can be connected to a number of different gateways, e.g., 130-1, 130-2, . . . , 130-N, across multiple different network types. FIG. 1 illustrates the PSTN 120 connected to the Internet 132 via gateway 130-2. The Internet 132 can, in turn, connect using TCP/IP to various other gateways, e.g. gateway 130-N.

An HLR is one such database in a cellular system that contains all the subscribers within the provider's home service area. A visiting location register (VLR) is another example of a database. For call delivery, a visited network tracks the location of a roaming user and a VLR reports that location information via the mobile network to the HLR of the home network. The VLR can also request information from the HLR in which case the data in the HLR is transferred via SS7 to a VLR in the new area. SS7 is the protocol used in the PSTN for setting up calls and providing services. The SS7 protocol sets up and tears down the call, handles all the routing decisions and supports all modern telephony services, such as 800 numbers, call forwarding, caller ID and local number portability (LNP). LNP allows a telephone subscriber to port his/her phone number when that subscriber relocates to a different region of the country, even when the local area code may be different.

An authentication center (AC) in a home network can be used for user registration and authentication, e.g., checking to see, among other things, if the user has made payments. Thus, VLRs, HLRs, SCPs, and authentication centers, among others, are examples of databases in a wireless telecommunications system which can store subscriber identity, location, and other user profile information. When a call relayed from the public switched telephony network (PSTN) to the home mobile switching center (MSC) is to be delivered to a subscriber, the home MSC consults the HLR to determine the current whereabouts of the subscriber, e.g. the current serving/visited MSC, and the call is then directed via links and the PSTN to the visited MSC currently serving the mobile device.

The MAP based signal, described above, can inform the HLR 116 of the network address associated with the MSC 104 currently serving the mobile device 102 and also request requisite subscriber information for providing mobile service to the roaming mobile device 102. The HLR 116 updates its database to store the network address representing the serving MSC 104 and also copies the requested subscriber information to the VLR 122 associated with the serving MSC 104. The network address representing the serving MSC 104 stored in the HLR 116 is later utilized by the mobile network to reroute any incoming call intended for the mobile device 102 to the serving MSC 104.

FIG. 2 illustrates a wireless data network such as a public wireless local area network (PwLAN). As shown in FIG. 2, the wireless data network can provide a signal link between a mobile device 202 and an access point (AP) 205. The AP 205 serves a similar role to the base station described above. The AP 205 is linked to an access point controller (APC) 203. The APC 203 is connected to the AP 205 over a packet switched signal link, e.g. Internet protocol (IP) link. APC 203 can provide a packet switched signal link, IP link, to the Internet 221 to connect packet switched signals to an internet service provider (ISP) 209 having a database which can perform an authentication, authorization, accounting (AAA) function within the IP network for the mobile device 202. Similar authentication and authorization databases can exist within a proprietary wireless local area network. APs can transmit and receive information using Bluetooth and Wi-Fi (Wireless Fidelity) protocols, among others. For example, 802.11 is a family of IEEE standards for WLANs. The IEEE 802.11a standard, for example, transmits in the 5 GHz frequency range and provides from 6 to 54 Mbps. The IEEE 802.11b standard, generally referred to as Wi-Fi, transmits in the 2.4 GHz frequency range and provides from 1 to 11 Mbps. In FIG. 2, such a radio/air interface 201 is illustrated between a mobile device and a home network. In FIG. 2, as a mobile device 202 roams it attempts to connect to the available RF band in its current location. For example, when the mobile device 202 roams into an 802.11 environment the mobile device will attempt to authenticate and register with an authentication, authorization, accounting (AAA) function within 802.11 network.

Media platforms as used in the communications industry by mobile networks, ISPs, corporate webservers, and advertising agencies, among others, are computing devices that include processor and memory capabilities, e.g., servers and databases. Media platforms can include hardware components, such as trunk lines, switches, routers, etc. Media platforms can also include software, application modules, firmware, and other computer executable instructions operable thereon. Modern media platforms are becoming more and more functional, or intelligent, in terms of the services they can provide in cooperation with the software tools that are provided thereon. Communications networks use these media platforms to provide enhanced services such as toll-free 800 call routing, prepaid calling card services, voice mail, ring tones, handset display wallpaper, text messaging, interactive voice response (IVR) applications, DTMF (dual tone multiple frequency) services, and virtual private network call routing in addition to regular phone services.

In a data services delivery environment, there are different top to bottom, or "stove-pipe", type software applications and connection channels. These individual applications and channels each contain their own user profile database. That is, as illustrated above, across different network types different subscriber or user profile data is stored. As such, individual user, or subscriber, profile date is often spread across many different network environments and locations which may or may not be accessible by different network applications.

DETAILED DESCRIPTION

Embodiments of the present invention provide for a user profile service (UPS) database and management program. Embodiments provide devices and system networks by which the UPS database and management program can be accessed across different network types, including mobile networks and wireless data networks, by different network applications. One method embodiment includes collecting user profile data from different network sources in a localized place, or database, within a mobile services delivery platform. The method includes providing business rule instructions to an application server within the platform environment to manage access to the collected user profile data in the database. The method further includes allowing different network service applications to access the collected user profile data as determined by the business rules. Embodiments of the UPS database and management program enable efficient deployment, development, integration, management, administration, and storage of the user profile data from the localized place in the mobile services delivery platform across different networks.

Figure 1:
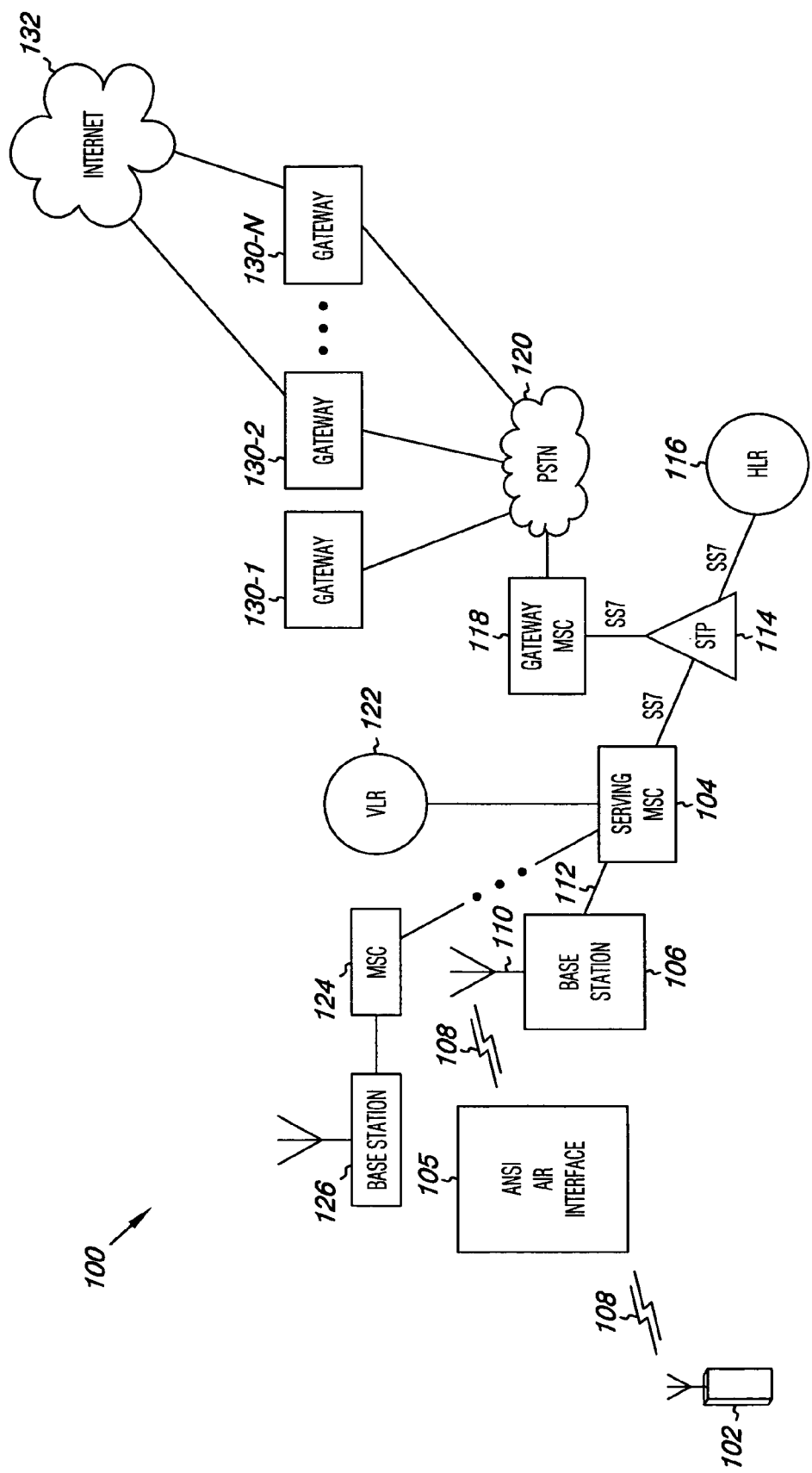
FIG. 1 is a block diagram embodiment of a mobile network illustrating a mobile device communicating with a mobile switching center.
Figure 2:
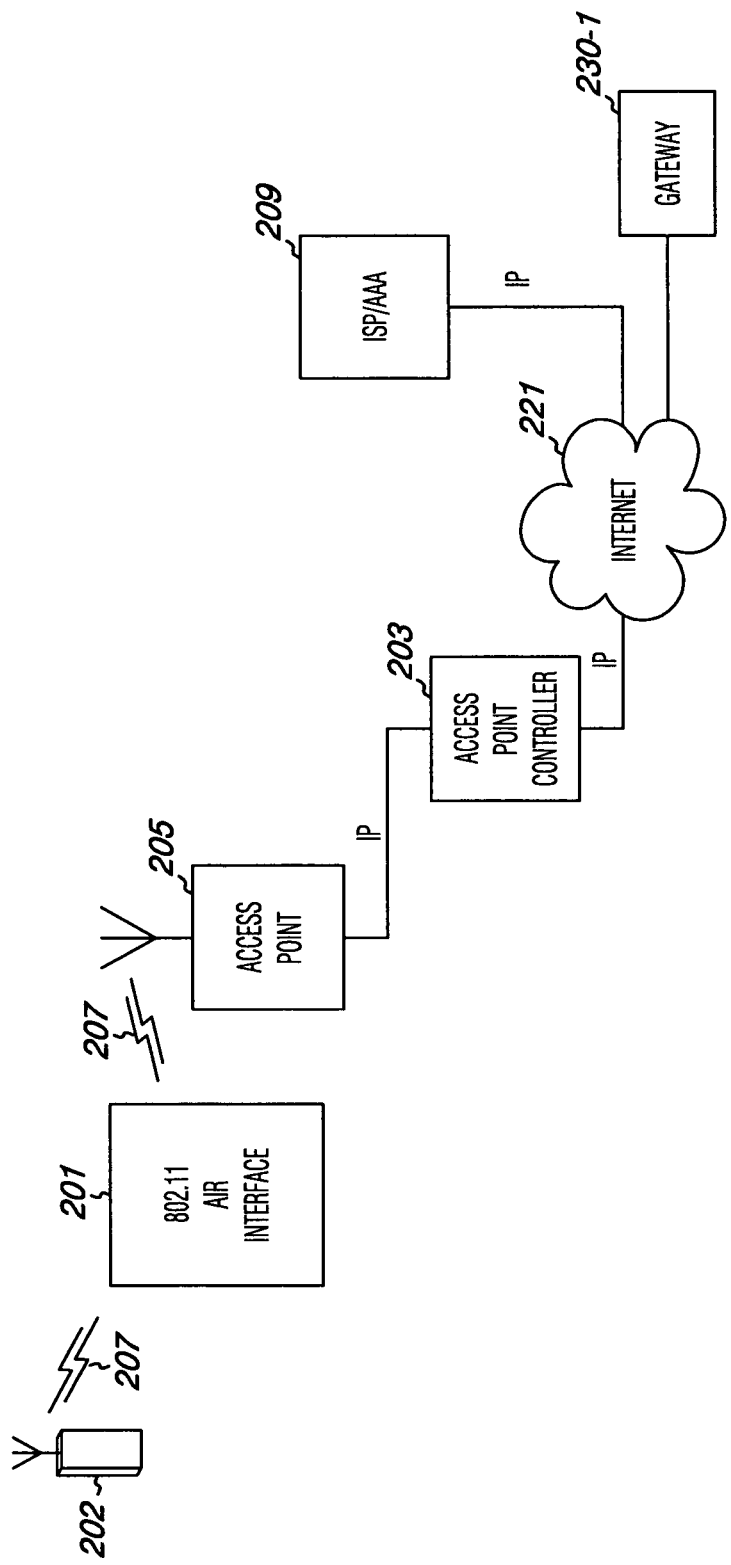
FIG. 2 illustrates block diagram embodiment of a wireless data network.
Figure 3:
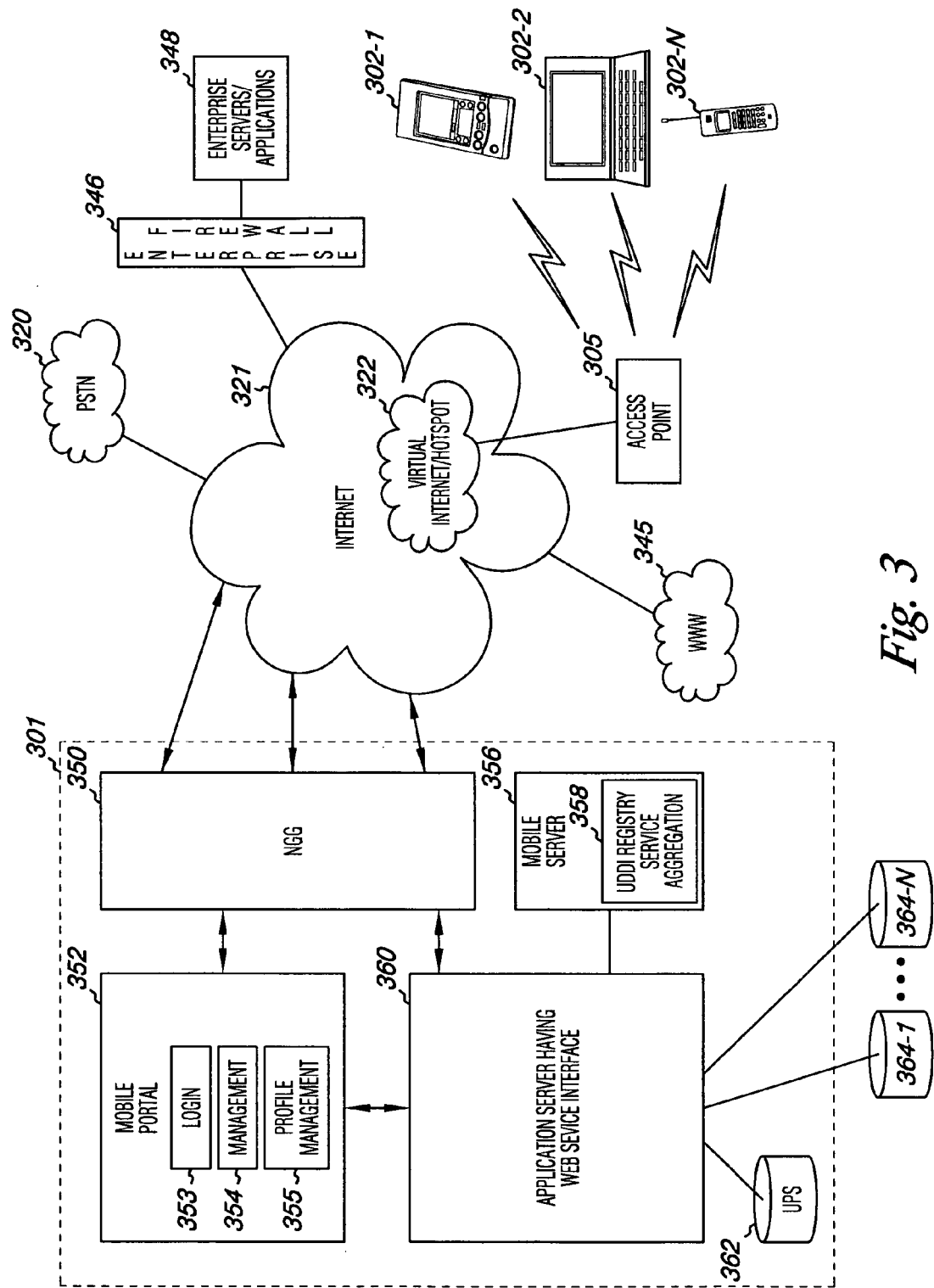
FIG. 3 is an embodiment of a media service delivery platform having connectivity to different network types.

FIG. 3 is an embodiment of a media service delivery platform having connectivity to different network types. FIG. 3 illustrates a number of mobile, portable devices, 302-1, 302-2, . . . , 302-N, which can be wireless enabled, e.g. can include a wireless network interface such as a wireless transceiver, wireless network interface card, and the like, as the same are known and understood by one of ordinary skill in the art. These mobile, portable devices, 302-1, 302-2, . . . , 302-N can include wireless enabled personal digital assistants (PDAs), communication handsets such as multifunction phones, Blackberry devices, laptop computers, among others to name a few. Each of these mobile, portable devices, 302-1, 302-2, . . . , 302-N may have different features and function capabilities dependent upon a particular device type. That is, some devices may include features such color displays and include functionality that provides for receiving streaming data from the Internet. Embodiments of the invention, however, are not limited to these examples. As described above, such wireless enabled devices are able to connect to access points in a network according to various RF protocols.

An access point 320 is illustrated in FIG. 3 conducting RF communication with such various devices. The access point 320 can include a base station in a mobile network and/or a wireless router/transceiver in a wireless LAN. In the embodiment of FIG. 3, the access point 320 can be a wireless "hotspot" such as a Bluetooth or Wi-Fi access point in a public location. Embodiments of the invention, however, are not limited to these examples. One of ordinary skill in the art will appreciate the manner in which such described access points 320 can provide a wireless to wireline connection for access to the Internet 321. Within this Internet connection 321 can exist a Virtual ISP which, as understood by one or ordinary skill in the art, can facilitate Internet connection with the wireless access point and handle roaming access, billing, and the like. As further illustrated in FIG. 3, the Internet 321 can have various connections, e.g., through gateways using TCP/IP, to the PSTN 320, to the world wide web (WWW) 345, and/or to other enterprise servers and applications 348 through an enterprise firewall 346 or otherwise.

The embodiment of FIG. 3 illustrates an embodiment of a mobile service delivery platform (MSDP) 301 having connections to the Internet 321, the PSTN 320, and the WWW 345. The MSDP 301 includes a gateway 350 for handling voice, data, and video traffic, etc. As one of ordinary skill in the art will appreciate upon reading this disclosure, in some embodiments the gateway 350 can provide authentication, access, and billing for connecting to the MSDP 301. Such gateways are often referred to as next generation gateways (NGGs).

In the embodiment of FIG. 3 the MSDP 301 is illustrated having a gateway 350 connected to a mobile portal 352. The mobile portal 352 can include a server that deploys portal services to a public web site or internal intranet. As one of ordinary skill in the art will appreciate, the mobile portal 352 can include applications used to develop, deliver and maintain the mobile portal. Such applications can include a variety of application tools and functions, including user authentication, identity management, a search facility and content aggregation capabilities. User personalization may also be a feature, which lets individuals customize their own web pages. In the embodiment of FIG. 3, these applications are illustrated, by way of example, as login 353, management 354, and profile management 355.

As shown in the embodiment of FIG. 3, the MSDP 301 includes a mobile server 356 accessible by the mobile portal 352. The mobile server 356 is accessible by the mobile portal via an application server having a web services interface 360. The mobile portal 352 is associated with a database 362 having a data structure for user profile services (UPS). That is, the associated database 362 contains user profile data. The application server having the web services interface 360 provides access to the associated database structure 362 for a user profile service (UPS). According to embodiments of the present invention, the application server having the web services interface 360 can be a Java 2 Platform, Enterprise Edition (J2EE) application server. As one of ordinary skill in the art will appreciate J2EE services are performed in a middle tier between a user's machine and an enterprise's databases. J2EE can include enterprise JavaBeans (EJBs), followed by JavaServer Pages (JSPs) and Java servlets, as well as a variety of interfaces for linking to information resources in an enterprise. One example of an application server includes the BEA WebLogic Server v7 as distributed and manufactured by BEA Systems, Inc.

According to embodiments of the invention, a program application (e.g., computer executable instructions) is provided to the application server having the web services interface 360 to expose the user profile data in the UPS database 362 to the mobile server 356. As discussed in more detail below, the program application includes a set of business logic instructions, which can be held in a memory and executed by a processor, to manage access and control of the user profile data. For example, the program application can execute instructions to register user profile data for services with the mobile server 356. As shown in the embodiment of FIG. 3, the mobile server 356 includes a business registry of web services 358. An example of such a registry includes a universal description, discovery, and integration (UDDI) registry as the same are known and understood by one of ordinary skill in the art. This example is illustrated in more detail in connection with FIG. 4.

According to embodiments of the invention, the set of business logic instructions, or business rules on the application server having the web services interface 360 can also be applied, e.g., instructions executed, to register certain user profile data in the UPS database 362 with a registry on one or more third party databases, e.g., 364-1, . . . , 364-N, and/or servers, e.g., 348, among different networks. According to embodiments of the invention, the web services interface 360 is discoverable and invokeable as a stand-alone web service. That is, as illustrated in the embodiment of FIG. 3, the gateway 350 can call the web services interface 360 directly. In this manner the web services interface is accessible across different network type applications.

The program application in connection with the web services interface uses templates to define profile elements in the user profile data and the templates are used to register the user profile data with the mobile server or databases and servers in different networks for application processing. Examples of the profile elements include; a user ID; a group ID; a user name; a preferred language; a status; a subscriber or user's first name; a subscriber or user's last name; a last login timestamp; a present location of a mobile device and/or a user (including a street, a street number, a zip, a city, and a country); a residence or work location of the user; a gender; a mobile subscription; a mobile subscriber ISDN or IMSI number; an email address; and hobby, clothing, culinary, or other interest information relating to a user including current location information obtained from a PLMN, a PwLAN, and/or a GPS enabled device, among others. Embodiments of the invention are not limited to these examples.

As explained in more detail below, the program application, according to the business rules on the application server having the web services interface 360, can execute instructions to control retrieval, update, and/or deletion of the user profile data. Embodiments of the program application can additionally execute instructions to log requests to and actions or services rendered in connection with the UPS database 362. Embodiments of the program application can additionally execute instructions to debug in connection with the UPS database 362. For example, the program application can execute instructions to; log updates to the associated database structure, log who performed updates; log when updates were performed; log what updates were implemented; log who made requests into the platform; log when requests were made; and log what information was requested. Further, the program application and its associated set of business rule instructions can integrate with business rule processing engines external to the platform 301.

Figure 4:
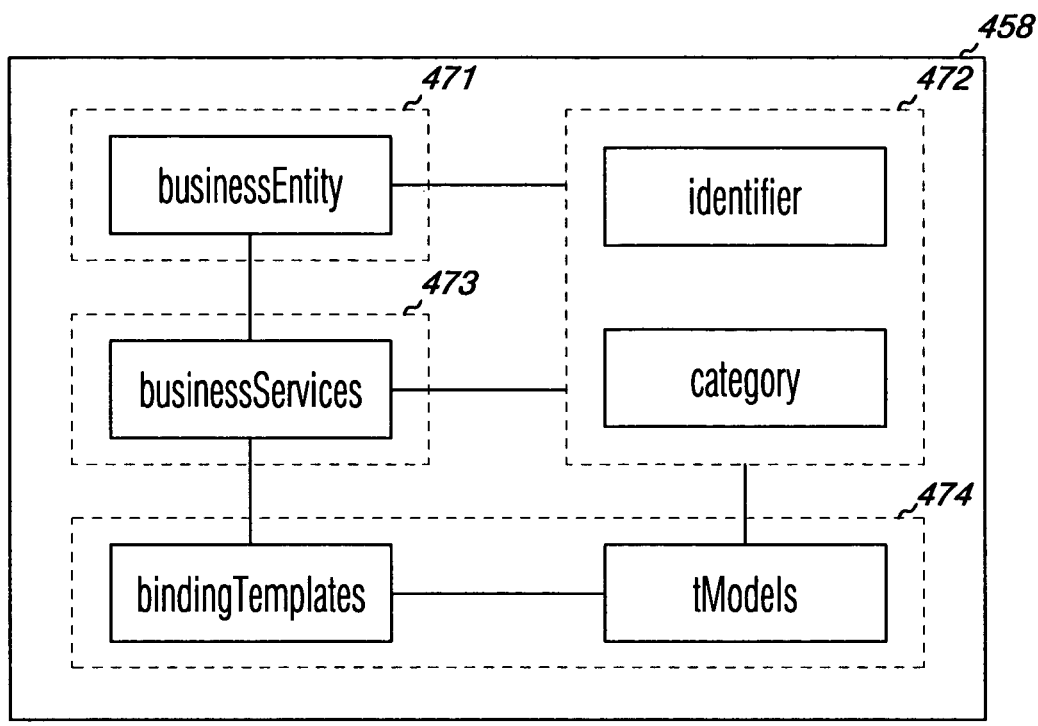
FIG. 4 illustrates an embodiment for a business registry of web services.

FIG. 4 illustrates an embodiment for a business registry of web services 458. As mentioned above, an example of such a registry includes a universal description, discovery, and integration (UDDI) registry as the same are known and understood by one of ordinary skill in the art.

Program embodiments of the present invention can execute instructions according to the set of business rules to automatically register user profile data from the UPS database described above into a business registry of web services on a mobile server, such as the one shown as 458, or to other business registries. This can be achieved using an auto-registration script as the same will be known and understood by one of ordinary skill in the art. As shown in the embodiment of FIG. 4, the business registry of web services can include a UDDI businessEntity 471, businessServices 473, and binding Templates and tmodels 474 as used to register user profile data. A business registry of web services, such as that shown in 458, will contain identifiers and categories 472 as the same are known and understood by one of ordinary skill in the art. These are not explained in more detail so as not to obscure the present invention.

As one of ordinary skill in the art will appreciate a UDDI is designed to enable software to automatically discover and integrate with services on the Web. Using a UDDI browser, individuals can review the information contained in the registry, which is a network of servers on the Internet similar to the Domain Name System (DNS). The UDDI will contain white pages (addresses and contacts), yellow pages (industry classification) and green pages (description of services). The green pages include the extended markup language (XML) version, type of encryption and a document type definition (DTD) for a given network standard. The UDDI thus can locate different network application services and provide the physical pointer to locate and direct a service request to a particular network application service. UDDI messages ride on top of simple object access protocol (SOAP), which invokes services on the Web.

Figure 5:
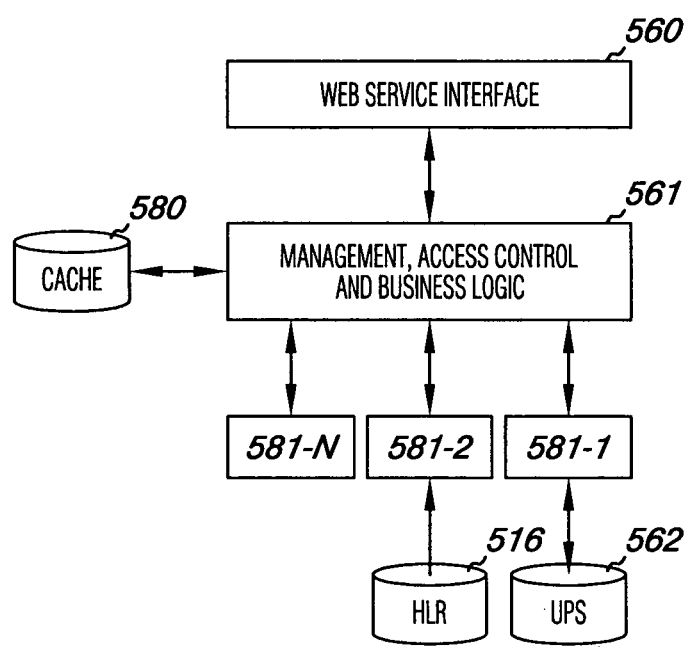
FIG. 5 illustrates a block diagram embodiment for the interaction of a program embodiment with a web services interface and a user profile service database.

FIG. 5 illustrates a block diagram embodiment for the interaction of the program embodiments with a web services interface and a UPS database as described herein. As mentioned above, the program embodiments and web services interface may reside on an application server such as a web logic server, e.g., a BEA WebLogic Server v7 or other type of application server. Embodiments are not limited to the examples given.

FIG. 5 illustrates a web service interface 560 connected to a program application 561 according to the embodiments described herein. That is, according to various embodiments a program application 561 with associated business logic instructions is coupled to the web services interface 560 which, as explained above, can further connect with a mobile server having a business registry. The program application can reside in memory and be executed by a processor on an application server. As mentioned above, embodiments of the present invention include a program application 561 with management, access, control and associated business logic instructions which can execute to handle requests associated with user profile data in a UPS database 562 and/or with other databases, e.g., an HLR database 516, in another and possibly different network type. For example, a subscriber or user's home address information may be contained in a backend database of a wireless network provider such as AT&T wireless. In this example, trusted third parties, e.g., a network provider such as AT&T, can instruct the program application as to how to access their backend databases programmatically. Using the program application 561 embodiments described herein, such user profile data located in the databases of different networks can be retrieved and/or pushed up to the UPS database 562. By its capability to integrate with external business rule processing engines such as OSA Parley capabilities, the program embodiments can invoke data services, such as short message service (SMS) text messaging, across different network types.

The program application can be connected to various databases via third party connectors, custom connectors, or otherwise. Such connectors are illustrated in FIG. 5 as 581-1, 581-2, . . . , 581-N. As between the program application 561 and the UPS database 562 the connector embodiments, e.g., 581-1, can include a Java Database Connector (JDBC) and the business logic instructions can include a series of Java classes to implement user profile services.

As further shown in FIG. 5, the embodiments can include providing the program application with a middle tier cache 580 to hold retrieved data from the UPS database 562 and/or other databases. The program application 561 in connection with the web services interface 560 can further include instructions executable to provide session management and to clear the middle tier cache 580.

Figure 6A:
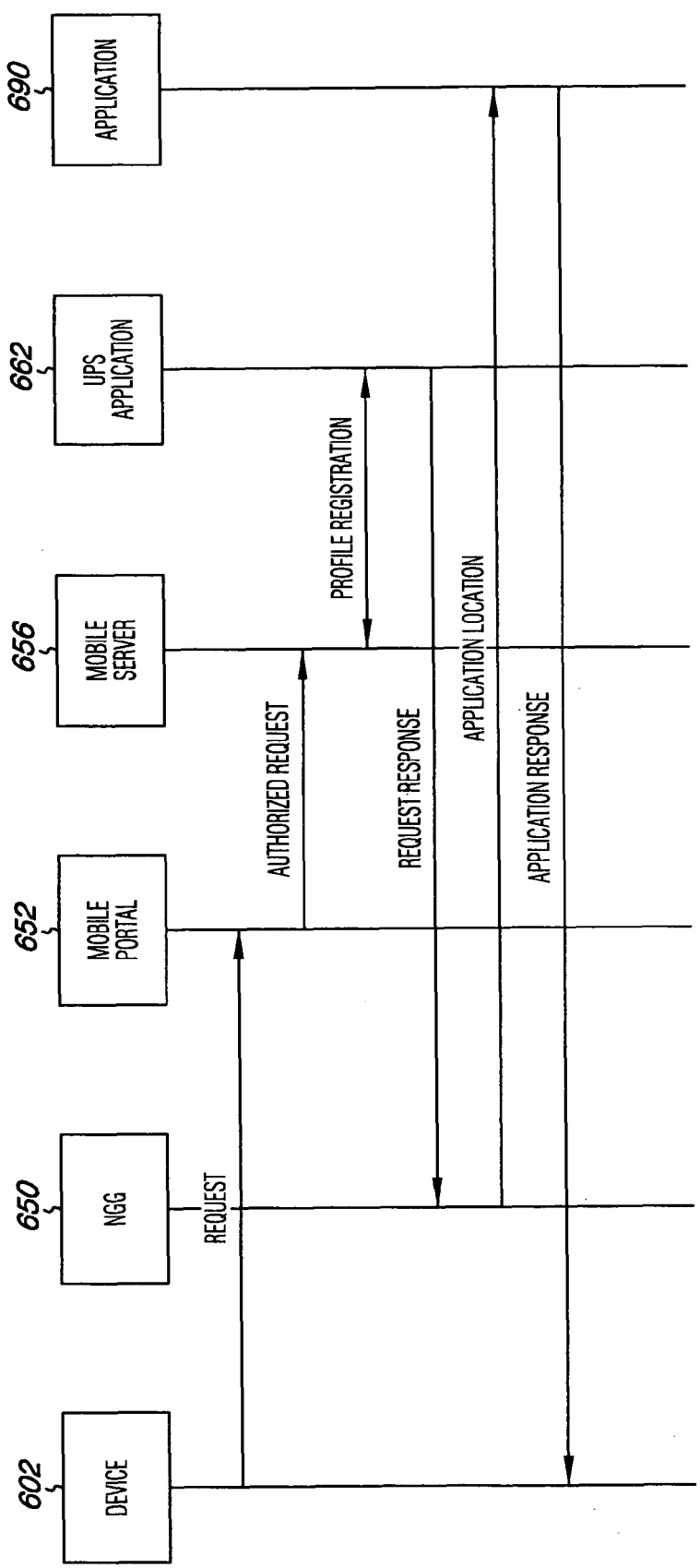
FIGS. 6A-6B illustrate flow diagrams associated with various embodiments.
Figure 6B:
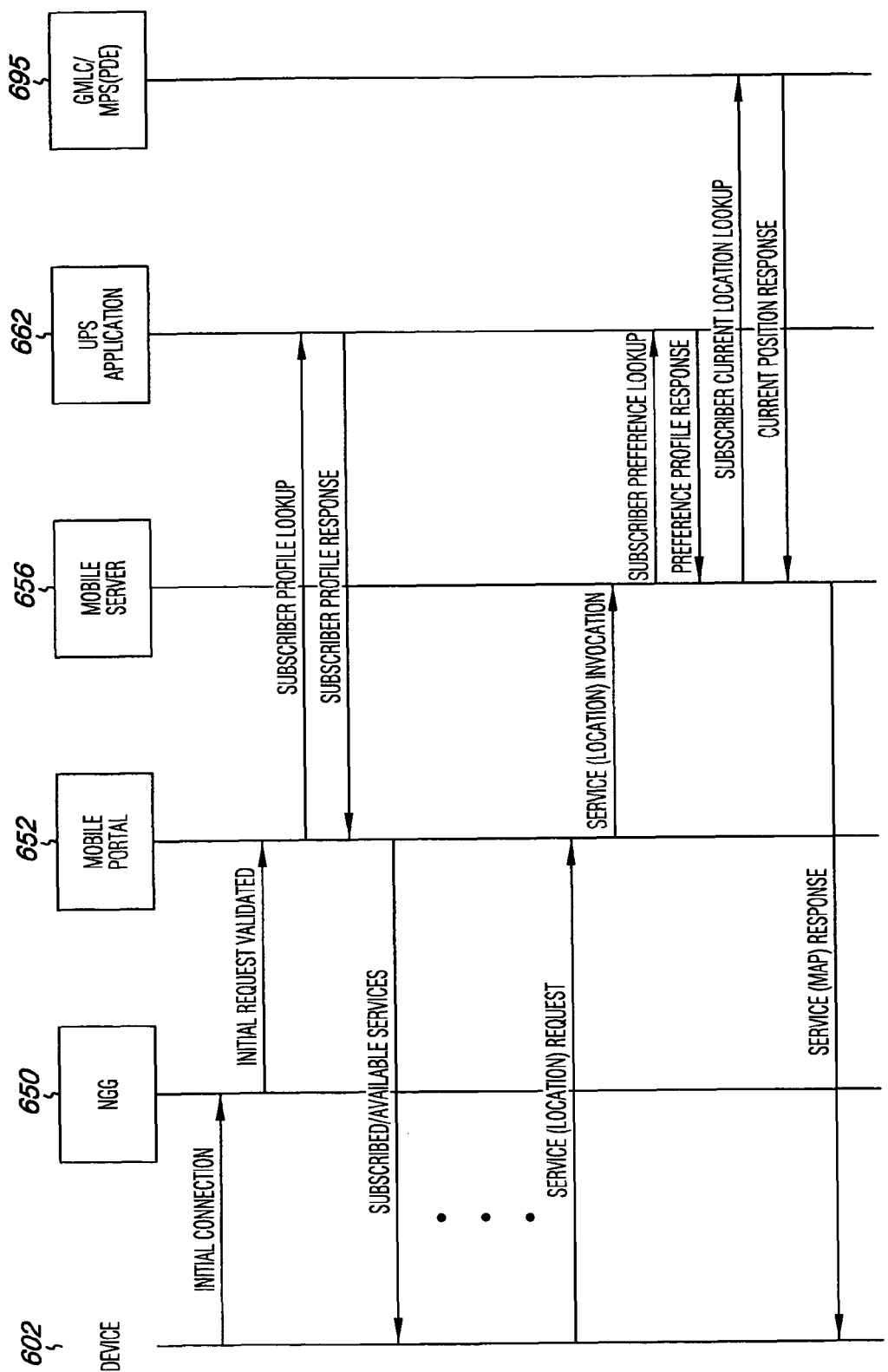
Figure 7:
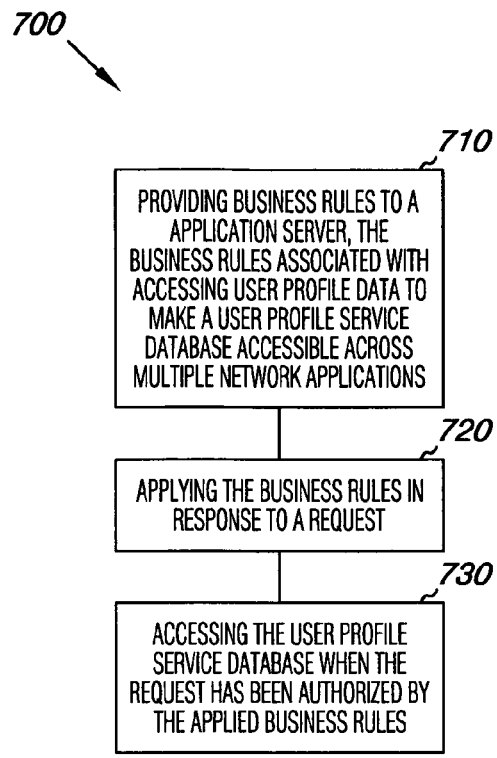
FIGS. 7-8 illustrates various method embodiments for a user profile service.
Figure 8:
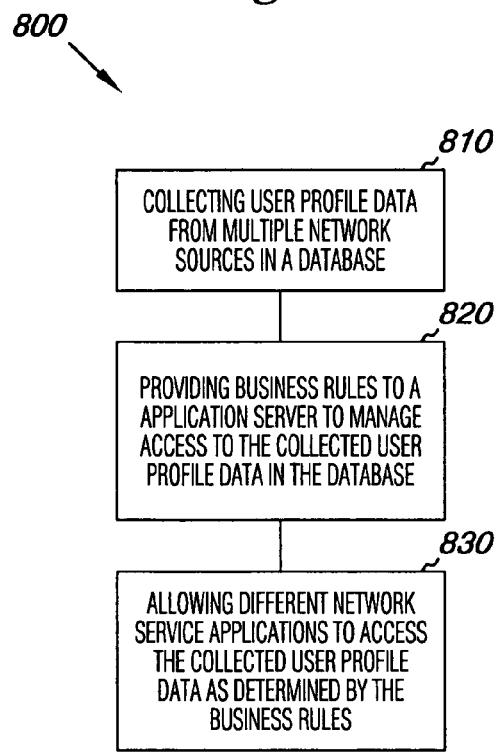

FIGS. 6A-6B illustrate flow diagrams associated with various embodiments. Additionally, FIGS. 7-8 illustrates various method embodiments for a user profile service. As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

FIG. 6A illustrates a message flow method embodiment associated with a user profile service. Embodiments, however, are not limited to the example illustrated in FIG. 6A. In the embodiment of FIG. 6A, a mobile device 602 sends a request to a gateway 650, such as a next generation gateway (NGG) as has been described above. By way of example and not by way of limitation, a user can send a request from the mobile device 602 to retrieve a listing of phone numbers from their enterprise or corporate phone directory. According to various embodiments the request can be implemented using a wireless application protocol (WAP) application conducted via a series of web markup language (WML) pages on the device 602 browser.

As shown in the embodiment of FIG. 6A, the request is transmitted through the NGG 650 to a mobile portal 652. The NGG can serve as the physical data service connector to the network on which the mobile device 602 is communicating. The NGG 650 can provide initial authorization to a session, e.g., the NGG 650 can provide authentication, access, and billing for connecting to a mobile service delivery platform such as MSDP 301 in FIG. 3. Additionally, the incoming request can trigger the NGG 650 to request user profile information utilizing a device 602 ID it stripped off of the incoming request. The NGG 650 can use the device 602 ID to perform header enrichment. For example, the NGG 650 can add header information to the request indicating a device type, including its features and function capability such as having a color display and/or the capability to receive streaming data. As another example, the NGG 650 can add header information to the request indicating the device's current location obtained from a PLMN, a PwLAN, and/or a GPS enabled device, among others.

As shown in the embodiment of FIG. 6A, the mobile portal 652 can send an authorized request on to a mobile server 656. As described above in connection with FIG. 3, the mobile portal 652 communicates with the mobile server 656 and a UPS application 662 via a web services interface, e.g., 360 in FIG. 3, associated with the mobile portal 652, the UPS application, and the mobile server 656.

As described above, the web services interface includes a program application having management, control, access, and business logic instructions which can execute to handle requests associated with user profile data in a UPS application 662, e.g., UPS database 362 in FIG. 3. User profile data can thus be registered in a business web services registry of the mobile server 656. In various embodiments, the web service interface, e.g., 360 in FIG. 3, uses a web services descriptor language (WSDL) document to register user profile data with the mobile server 656. And, in various embodiments, the WSDL document is automatically generated from a Java Integrated Development Environment (IDE). In various embodiments, the user profile data request is submitted in the form of a WSDL document and transmitted via simple object access protocol (SOAP) to the business web services registry of the mobile server 656, e.g., to a UDDI registry. As one of ordinary skill in the art will appreciate, SOAP is a message-based protocol based on extensible markup language (XML) for accessing services on the Web. SOAP employs XML syntax to send text commands across the Internet using hypertext transport protocol. In alternative embodiments, the profile information request is submitted to the mobile server using Java Messaging Service (JMS), using a messaging middleware application, and/or using a common object request broker architecture (CORBA). In this manner, profile registration information and messages for user profile data can be communicated and registered between a UPS application 662, e.g., UPS database 362 in FIG. 3, and the mobile server 656. Through use of the program application, a given user profile service having been registered in the mobile server 656 allows a UPS application 662 to send a request response back to the NGG 650.

Thus, according to embodiments of the present invention, a program application in connection with web service interface, e.g., 360 in FIG. 3, can execute instructions to perform the required query of user profile information in the UPS application 662, e.g., UPS database 362 in FIG. 3, and transmit the information back to the NGG 650, e.g., again using WSDL and SOAP. As mentioned above in connection with FIG. 5, the user profile information can be cached in a middle tier cache such that subsequent requests do not have to experience the system overhead of repeating the user profile query. Once the user profile information is obtained by the NGG 650, the request again uses the mobile server 656 and its business registry, e.g., UDDI web services system, to find the appropriate network service application 690, shown as application location in FIG. 6A. Located, the network service application 690 can generate a response, shown as application response in FIG. 6A, back to the mobile device 602.

FIG. 6B illustrates another flow diagram associated with various embodiments. The embodiment of FIG. 6B illustrates a UPS service and various other elements that are involved in (a) Subscriber: Initial Connection request—where the subscriber is validated at the NGG (for example a Radius server) and then the subscribers Service Profile is retrieved and sent back to the subscriber from the UPS Service, and (b) how the UPS Service is involved during a service invocation flow—involving a Location Server.

In the embodiment of FIG. 6B, a mobile device 602 sends an Initial Connection request to a gateway 650, such as a next generation gateway (NGG) as has been described above. Again, according to various embodiments the request can be implemented using a wireless application protocol (WAP) application conducted via a series of web markup language (WML) pages on the device 602 browser.

As shown in the embodiment of FIG. 6B, the NGG 650 transmits a Validated Connection request to a mobile portal 652. As in FIG. 6A, the NGG can serve as the physical data service connector to the network on which the mobile device 602 is communicating. The NGG 650 can provide initial authorization to a session, e.g., the NGG 650 can provide authentication, access, and billing for connecting to a mobile service delivery platform such as MSDP 301 in FIG. 3. As in FIG. 6A, the incoming request can trigger the NGG 650 to request user profile information utilizing a device 602 ID it stripped off of the incoming request. The NGG 650 can use the device 602 ID to perform header enrichment. For example, the NGG 650 can add header information to the request indicating a device type, including its features and function capability such as having a color display and/or the capability to receive streaming data. As another example, the NGG 650 can add header information to the request indicating the device's current location obtained from a PLMN, a PwLAN, and/or a GPS enabled device, among others.

As shown in the embodiment of FIG. 6B, the mobile portal 652 can send a Subscriber Profile lookup request through a mobile server 656 and on to a UPS Application 662 database. As described above in connection with FIG. 3, the mobile portal 652 communicates with the mobile server 656 and a UPS application 662 via a web services interface, e.g., 360 in FIG. 3, associated with the mobile portal 652, the UPS application 662, and the mobile server 656.

As described above, the web services interface includes a program application having management, control, access, and business logic instructions which can execute to handle requests associated with user profile data in a UPS application 662, e.g., UPS database 362 in FIG. 3. User profile data can thus be registered in a business web services registry of the mobile server 656. As described above, in various embodiments the web service interface, e.g., 360 in FIG. 3, uses a web services descriptor language (WSDL) document to register user profile data with the mobile server 656. And, in various embodiments, the WSDL document is automatically generated from a Java Integrated Development Environment (IDE). In various embodiments, the user profile data request is submitted in the form of a WSDL document and transmitted via simple object access protocol (SOAP) to the business web services registry of the mobile server 656, e.g., to a UDDI registry. In alternative embodiments, the profile information request is submitted to the mobile server using Java Messaging Service (JMS), using a messaging middleware application, and/or using a common object request broker architecture (CORBA). In this manner, profile registration information and messages for user profile data can be communicated and registered between a UPS application 662, e.g., UPS database 362 in FIG. 3, and the mobile server 656 or mobile portal 652. As shown in the embodiment of FIG. 6B, the UPS Application 662, through use of the program application, returns a Subscriber Profile response to the mobile portal 652. The mobile portal in turn can transmit Subscribed and/or Available service information back through the NGG 650 to the mobile device 602.

For the service invocation flow, e.g., (b) above, the mobile device 602 sends a Service (e.g., Location) request through the NGG 650 to the mobile portal 652. The mobile portal, using the program instructions, can initiate Service (Location) invocation to the mobile server 656. The mobile server 656 sends a Subscriber Preference lookup to the UPS Application 662. The UPS Application 662 returns a Preference Profile response to the mobile server 656. The mobile server 656 can then transmit a Subscriber Current Location lookup to a GMLC (general mobile location center in GSM networks) or MPC (mobile positioning center, e.g., position determining equipment (PDE), in CDMA networks) 695. In the embodiment of FIG. 6B the GMLC/MPC (PDE) 695 have been combined for ease of reference. The flows from such a "location server", as the same will be known and understood by one of ordinary skill in the art and which are determined by the logic embedded in such a location server, are not illustrated so as not to obscure the present invention. As shown in FIG. 6B, the GMLC/MPC (PDE) 695 returns a Current Position response to the mobile server 656. The mobile server 656 then returns a Service (MAP) response, as the same are known and understood by one of ordinary skill in the art to the remote device through the mobile portal 652 and the NGG 650.

It is noted that various flow scenarios can include embodiments in which the location server, described above, can actually send a request to the UPS Application 662 server regarding subscriber privacy option. Such an embodiment could introduce the use of a location enabling server (LES), as the same are known and understood by one of ordinary skill in the art, which would be connected between the UPS Application 662 server and the GMLC/MPC (PDE) 695. In such an embodiment subscribers privacy requirements would be loaded into the LES at the Initial Connection request time.

Thus again according to embodiments of the present invention, a program application in connection with a web service interface, e.g., 360 in FIG. 3 using WSDL and SOAP, etc., can execute instructions to perform a query of user profile information and/or invoke services in the UPS Application 662, e.g., UPS database 362 in FIG. 3, and return the same to a mobile device 602.

FIG. 7 illustrates another method embodiment for a user profile service. As shown in the embodiment of FIG. 7, the method includes providing business rules to an application server having an exposed web services interface as shown in block 710. According to the various embodiments, the business rules are associated with accessing user profile data to make a user profile service database accessible across multiple network applications. In block 720 the method includes applying the business rules in response to a request. As shown in block 730 the method further includes accessing the user profile service database when the request has been authorized by the applied business rules. In various embodiments, the method further includes receiving an authorized request from a user of a mobile device to update the user profile data. In various embodiments, the method further includes receiving a request from a mobile device for a service application.

In various embodiments, the method further includes an application server receiving identification and location information associated with a mobile device, e.g., via header enrichment from a NGG. According to various program embodiments described herein, the application server provides a service application to the mobile device based on the identification and the location information. In various embodiments, the method further includes receiving a request from a third party entity to update the user profile data and allowing a third party entity to update the user profile for requests which have been authorized by the applied business rules and/or denying a third party entity access to update the user profile for requests which are not authorized by the applied business rules. In various embodiments, the method further includes providing a third party service application to a mobile device based on the user profile data for requests which have been authorized by the applied business rules. In various embodiments, the method further includes an application server collecting user profile data from a number of third party network databases to populate the user profile service database through application of the business rules.

FIG. 8 illustrates another method embodiment for a user profile service. In the embodiment of FIG. 8, the method includes collecting user profile data from different network sources in a localized database as shown in block 810. In block 820 the method further includes providing business rules to an application server to manage access to the collected user profile data in the database. And, in block 830 the method includes allowing different network service applications to access the collected user profile data as determined by the business rules. Embodiments can include a computer readable medium having instructions for causing a device to perform the method.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. A service delivery platform, comprising:
a gateway having connectivity to a communication network;
a mobile portal having connectivity to the gateway;
a mobile server accessible by the mobile portal;
a processor; and
an application server, to be executed by the processor, the application server having a web services interface connecting the mobile portal to the mobile server, and the mobile portal is to communicate with the mobile server via the web services interface of the application server,
wherein the application server includes a set of rules to manage access to user profile data in a user profile service database, wherein the user profile data in the user profile service database is collected from multiple network sources,
wherein the set of rules includes executable instructions to make the user profile data accessible across multiple network applications,
wherein the application server is to apply the set of rules in response to a request from one of the multiple network applications, and allow said network application to access the user profile data in the user profile service database when the request has been authorized by the set of rules, and
wherein the web services interface is to register the user profile data for services with the mobile server.
2. The platform of claim 1, wherein the web services interface is discoverable and invokeable as a stand-alone web service.

3. The platform of claim 1, wherein the application server having the web service interface uses a web services descriptor language (WSDL) document to register the user profile data with the mobile server.

4. The platform of claim 3, wherein the WSDL document is automatically generated from a Java Integrated Development Environment (IDE).

5. The platform of claim 1, wherein the set of rules of the application server is to integrate with business rule processing engines external to the platform.

6. The platform of claim 1, wherein the application server having the web services interface includes program instruction to access the mobile server using simple object access protocol (SOAP).

7. The platform of claim 1, wherein the application server having the web services interface includes program instruction to access the mobile server using Java Messaging Service (JMS).

8. The platform of claim 1, wherein the application server having the web services interface includes program instruction to access the mobile server using a messaging middleware application.

9. The platform of claim 1, wherein the application server having the web services interface includes program instruction to access the mobile server within a common object request broker architecture (CORBA).

10. The platform of claim 1, wherein the application server having the web services interface includes a middle tier cache to hold retrieved data from the user profile service database.

11. The platform of claim 10, wherein the application server having the web services interface further includes program instructions to provide session management and to clear the middle tier cache.

12. The platform of claim 1, wherein the set of rules is to control retrieval, update, and deletion of the user profile data.

13. The platform of claim 1, wherein the set of rules further includes instructions to log and debug.

14. The platform of claim 13, wherein the instructions to log include instructions to:
    log updates to the user profile service database;
    log who performed updates;
    log when updates were performed;
    log what updates were implemented;
    log who made requests into the platform;
    log when requests were made; and
    log what information was requested.

15. The platform of claim 1, wherein the gateway connects the mobile portal to the communication network.

16. The platform of claim 1, wherein the mobile server includes a universal business registry of web services.

17. The platform of claim 1, wherein the application server having the web services interface and the user profile service database are to be accessed directly by the gateway.

18. The platform of claim 1, wherein the application server having the web services interface uses templates to define profile elements in the user profile data.

19. The platform of claim 18, wherein the templates are used by program instructions to register the user profile data with the mobile server for application processing.

20. The platform of claim 18, wherein the profile elements are selected from the group of:
    a user ID;
    a group ID;
    a user name;
    a preferred language;
    a status;
    a first name;
    a last name;
    a last login timestamp;
    a street;
    a street number;
    a zip;
    a city;
    a country;
    a gender;
    a mobile subscription;
    a mobile subscriber ISDN;
    a current device location; and
    an email address.

21. The platform of claim 1, wherein the application server having the web services interface is accessible across multiple network applications.

22. The platform of claim 1, wherein the application server having the web service interface includes program instructions to register the user profile data in the user profile service database with a business registry of the mobile server and with a registry on one or more third party servers.

23. The platform of claim 1, wherein the application server is to receive an authorized request from a user of a mobile device to update the user profile data.

24. The platform of claim 1, wherein the application server is to receive identification and location information associated with a mobile device, and provide a service application to the mobile device based on the identification and the location information.

25. The platform of claim 1, wherein the application server is to receive a request from a third party entity to update the user profile data.

26. The platform of claim 1, wherein the application server is to provide a third party service application to a mobile device based on the user profile data.

27. The platform of claim 1, wherein the application server is to collect the user profile data from a number of third party network databases to populate the user profile service database.

28. A method for user profile service, comprising:
    collecting, by an application server, a given user's user profile data from multiple network applications in a localized database,
    wherein the application server includes a web services interface connecting a mobile portal with a mobile server, the mobile portal to communicate with the mobile server via the web services interface,
    wherein the web services interface is to register the user profile data for services with the mobile server;
    providing a set of rules to the application server to manage access to the given user's user profile data in the database,
    wherein the set of rules includes executable instructions to make the user profile data accessible across the multiple network applications,
    applying, by the application server, the set of rules in response to a request from one of the multiple network applications; and
    allowing said network application to access the user profile data in the user profile database based on the request being authorized by the set of rules.

29. A non-transitory computer readable medium having instructions for causing a device to perform a method, comprising:
    collecting, by an application server, a given user's user profile data from multiple network applications in a localized database, wherein the application server includes a web services interface connecting a mobile portal with a mobile server, the mobile portal to communicate with the mobile server via the web services interface, wherein the web services interface is to register the user profile data for services with the mobile server;

providing a set of rules to the application server to manage access to the given user's user profile data in the database, wherein the set of rules includes executable instructions to make the user profile data accessible across the multiple network applications, applying, by the application server, the set of rules in response to a request from one of the multiple network applications; and allowing said network application to access the user profile data in the user profile database based on the request being authorized by the set of rules.

* * * * *